(12) United States Patent
    Uilecan et al.

(10) Patent No.: US 9,113,309 B2
(45) Date of Patent: Aug. 18, 2015

(54) ENHANCING USER SERVICES WITH INDOOR TRAFFIC INFORMATION

(71) Applicant: Apple Inc., Cupertino, CA (US)

(72) Inventors: Ioan Vlad Uilecan, Cupertino, CA (US); Sarin Shreyas Mehta, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 90 days.

(21) Appl. No.: 13/958,290

(22) Filed: Aug. 2, 2013

(65) Prior Publication Data

US 2015/0038171 A1    Feb. 5, 2015

(51) Int. Cl.
    *H04W 24/00* (2009.01)
    *H04W 4/04* (2009.01)

(52) U.S. Cl.
    CPC .................... *H04W 4/04* (2013.01)

(58) Field of Classification Search
    CPC ......... H04W 64/00; H04W 4/02; H04W 4/04; H04W 4/021; H04W 4/023; H04W 4/043; H04W 48/04
    USPC .......... 455/456.1, 456.3, 456.5, 414.1, 414.2, 455/414.3
    See application file for complete search history.

(56) References Cited

U.S. PATENT DOCUMENTS

| | | | |
|---|---|---|---|
| 2005/0221806 A1* | 10/2005 | Sengupta et al. | 455/414.3 |
| 2008/0081641 A1* | 4/2008 | Smith et al. | 455/456.3 |
| 2010/0217525 A1* | 8/2010 | King et al. | 701/300 |
| 2013/0252591 A1* | 9/2013 | Sasaki et al. | 455/414.1 |
| 2013/0281115 A1* | 10/2013 | Dupray et al. | 455/456.1 |
| 2014/0180583 A1* | 6/2014 | Doherty et al. | 701/517 |
| 2014/0223479 A1* | 8/2014 | Krishnamoorthi et al. | 725/39 |
| 2014/0278035 A1* | 9/2014 | Nortrup | 701/119 |
| 2014/0335900 A1* | 11/2014 | Farris | 455/456.3 |

OTHER PUBLICATIONS

International Search Report and Written Opinion of the International Searching Authority, International Application No. PCT/US14/45578. Feb. 11, 2014.

* cited by examiner

*Primary Examiner* — Temica M Beamer
(74) *Attorney, Agent, or Firm* — Fish & Richardson P.C.

(57) ABSTRACT

In some implementations, a mobile device can collect location, time and speed information associated with a building. The mobile device can transmit the location, time and speed information to a server. The server can collect location, time and speed information from multiple mobile devices. The server can determine average wait times (e.g., indoor traffic information) associated with areas of interest at a business or indoor location. The server can deliver the average wait times to mobile devices. The mobile devices can use the indoor traffic information to adjust reminders, calendar events, suggest the best times to visit a business or suggest which of several businesses to visit.

20 Claims, 7 Drawing Sheets

ENHANCING USER SERVICES WITH INDOOR TRAFFIC INFORMATION

TECHNICAL FIELD

The disclosure generally relates to techniques for monitoring device locations within buildings.

BACKGROUND

Mobile devices offer many different types of services to assist a user in managing the user's schedule. For example, mobile devices provide calendars and alerts to help the user keep track of meetings, appointments, and errands that the user must attend. Often, the meetings, appointments, errands, etc. involve a business that provides goods or services to the user. For example, a user may shop for groceries at a grocery store. The user may travel using an airline or bus service that operates out of an airport or a bus station. The amount of time that a user spends running an errand can depend on the amount of traffic (e.g., other customers) encountered at a business or building associated with the business. The user can avoid wasting time when visiting a business if the user can avoid high traffic periods of the day at the business.

SUMMARY

In some implementations, a mobile device can collect location, time and speed information associated with a building. The mobile device can transmit the location, time and speed information to a server. The server can collect location, time and speed information from multiple mobile devices. The server can determine average wait times (e.g., indoor traffic information) associated with areas of interest at a business or indoor location. The server can deliver the average wait times to mobile devices. The mobile devices can use the indoor traffic information to adjust reminders, calendar events, suggest the best times to visit a business or suggest which of several businesses to visit.

Particular implementations provide at least the following advantages: Users are better able to manage time when the user is able to predict how much time will be spent inside a business location. Users can be provided with indoor traffic forecasts that predict the amount of traffic or the wait times experienced by users at a business. The users can use the forecasts to determine the best time to visit the business.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Overview

In some implementations, a mobile device can be configured to determine its location within a building. For example, a mobile device can receive wireless signals from wireless transmitters within a building and use the signals and the known location of the wireless transmitters to determine the location of the mobile device within a building. The mobile device can determine its location at various times and transmit the location and time information to a server.

In some implementations, the mobile device can determine its speed and transmit the speed information to the server. For example, the speed of the mobile device can be determined based on the change in indoor location of the mobile device over time. The speed of the mobile device can be determined based on sensor data generated by sensors of the mobile device. For example, the mobile device can include an accelerometer that can be used to measure the motion of the mobile device and derive the speed of the mobile device from the measured motion. The measured motion can be correlated to steps of the user, for example, and the speed of the mobile device can be derived from the pace of the user as the user is walking.

In some implementations, the server can determine indoor traffic information for a building (e.g., associated with a business) based on location, speed and time information transmitted to the server from multiple mobile devices. For example, the location and time information can be analyzed by the server to determine around which locations in a building (e.g., a store, business, etc.) mobile devices appear to loiter and for how long (on average) the mobile devices appear to loiter around various locations. The speed information can be used to determine fast or slow movement through a building and at various locations to determine where users are required to slow down or stop due to crowding or traffic in the building.

In some implementations, the indoor traffic information can be compared to known locations of interest. For example, a location of interest can be a checkout register at a store, a service counter at a business, a security checkpoint at the airport, an entry to or exit from a building or any other location that may create a bottle neck or slowdown when users or customers are moving through a business. For example, the indoor traffic information can be used to determine when and where queues form within the building and how long it takes a mobile device to move through the queue. The locations of interest can be determined dynamically based on indoor traffic data collected from mobile devices. The locations of interest can be determined based on predefined indoor map data associated with buildings or businesses.

In some implementations, the server can determine how long mobile devices (and their users) loiter around locations of interest or remain in a queue. For example, the server can analyze the indoor traffic information to determine how long (e.g., on average) mobile devices have to wait near a cash register location. In some implementations, a proximity radius can be used to determine when a mobile device is waiting to move through a location of interest. For example, if the mobile device is within ten feet of a location of interest, that mobile device's location information can be used to determine how long it takes the mobile device to move through the location of interest.

In some implementations, location, speed, and direction of movement can be used to determine traffic associated with a location of interest. For example, if the mobile device is moving toward the location of interest over time, then the mobile device's movements can be used to determine how long it takes to move through the location of interest. If the mobile device is moving away from the location of interest, then the mobile device's movements will not be used to determine how long it takes to move through the location of interest.

In some implementations, the indoor traffic information can be used to inform or adjust services provided by the mobile device. For example, if a user has a flight scheduled in a calendar application provided by the mobile device, the mobile device can use indoor traffic information associated with the airport from which the user will be departing to adjust the calendar reminder so that the user can get to the departing gate on time. If the user has scheduled a reminder to go to the grocery store, the mobile device can suggest a grocery store to visit or when to visit a particular grocery store based on the indoor traffic information. Other services provided by the mobile device can utilize indoor traffic information to help the user save time, as described further below.

Indoor Location Tracking

Figure 1:
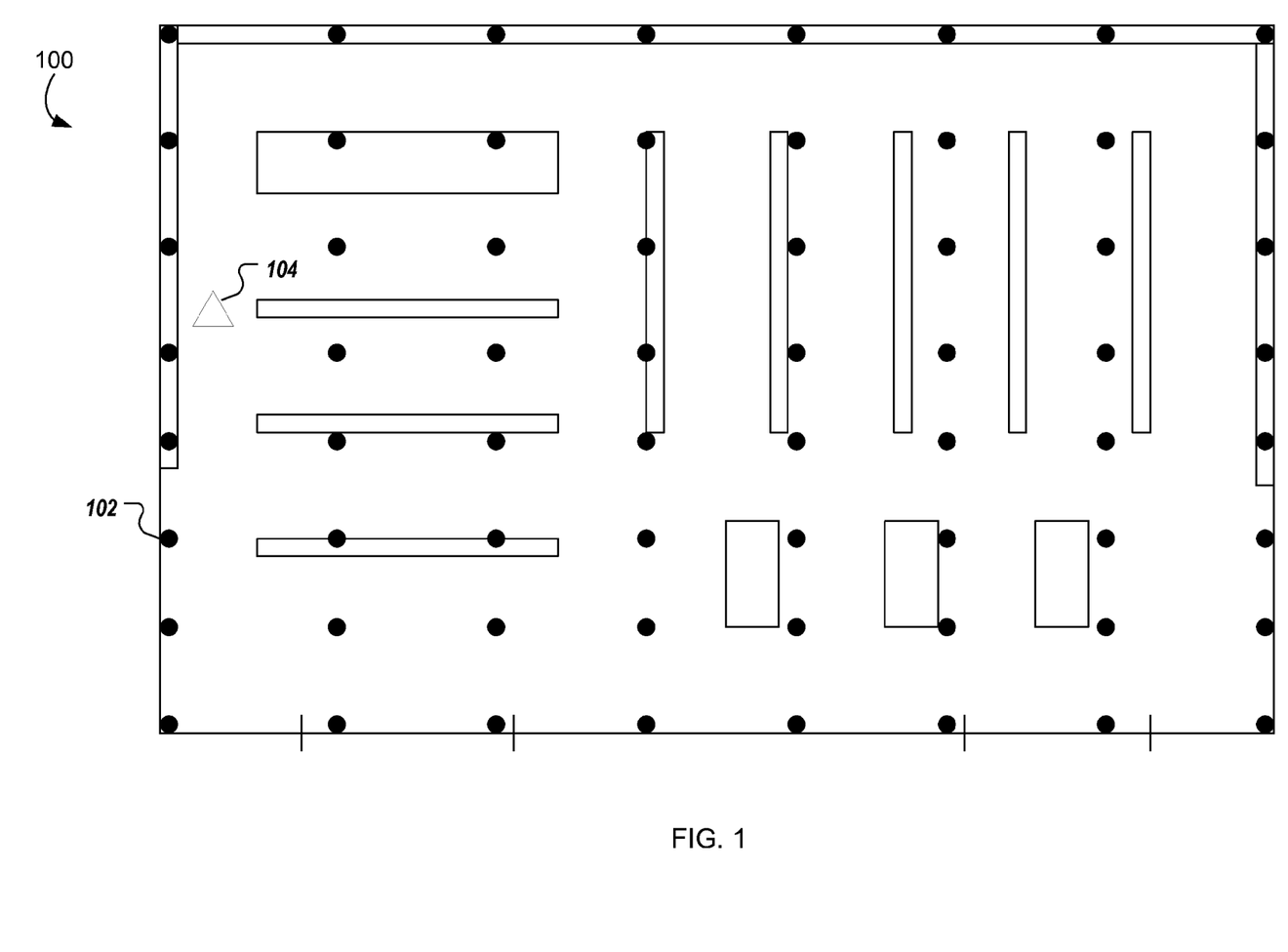
FIG. 1 illustrates a building that has been configured for tracking the indoor location of a mobile device.

FIG. 1 illustrates a building 100 that has been configured for tracking the indoor location of a mobile device. For example, building 100 can correspond to a grocery store, a departments store, an airport, a bus terminal or any other location or building. In some implementations, building 100 can be configured with wireless transmitters (e.g., black dots, item 102). The wireless transmitters can be Wi-Fi transmitters, Bluetooth beacons (e.g., Bluetooth LE), radio frequency identification tags, or other wireless transmission devices. The wireless transmitters can wirelessly transmit a signal to mobile device 104. For example, the wireless signals can include identification information that identifies the wireless transmitter that transmitted the signal. The wireless signal can include timing information that indicates when the received signal was transmitted.

In some implementations, the mobile device 104 can collect the wireless signals from multiple transmitters in building 100 and use the identification information, timing information and the received signal strength to determine the location of mobile device 104. For example, the mobile device 104 can store wireless transmitter location information that identifies the locations of wireless transmitters within building 100. The mobile device 104 can compare the wireless transmitter identification information received in the wireless signals to the wireless transmitter location information stored at the mobile device to determine the locations of the wireless transmitters associated with the received signals. The mobile device can then use the wireless transmitter location information, received signal strength and/or timing information to determine the location of mobile device 104 within building 100. For example, the mobile device 104 can use well known triangulation, trilateration, location averaging or other location estimation techniques to estimate the location of the mobile device 104 based on the received wireless signals.

Figure 2:
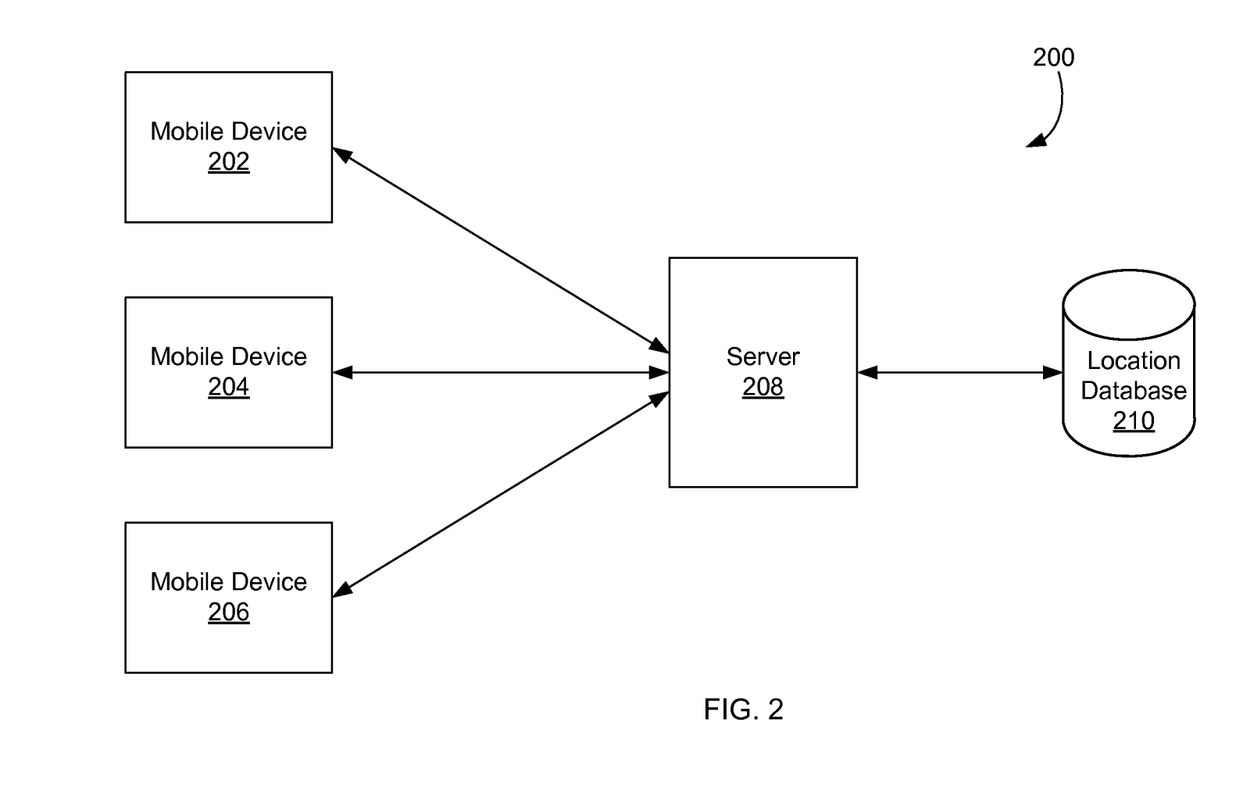
FIG. 2 is a block diagram of a system for generating indoor traffic information based on location data received from mobile devices.

FIG. 2 is a block diagram of a system 200 for generating indoor traffic information based on location data received from mobile devices. System 200 can include mobile devices 202, 204 and 206. For example, mobile devices 202, 204 and/or 206 can correspond to mobile device 104 of FIG. 1. In some implementations, mobile devices 202, 204, and/or 206 can transmit indoor location information to server 208 so that server 208 can generate indoor traffic information associated with a building. The operations described with reference to mobile device 202 below can apply equally to mobile devices 204 and 206, for example.

In some implementations, mobile device 202 can transmit indoor location and/or speed information to server 208. For example, mobile device 202 can use global navigation satellite signals (GNSS, GPS, etc.) to determine the location of the mobile device. The GNSS derived location can be used to identify a building in which the mobile device is located. For example, the GNSS derived location can be compared to map data stored on mobile device 202 or server 208 to determine the building in which mobile device 202 is currently located. The GNSS derived location can be compared to information that maps GNSS locations to building identifiers, such as the database tables of FIG. 3, to determine in which building mobile device 202 is currently located. However, some GNSS implementations may not provide accurate enough location estimates to track the location of mobile device 202 inside the building. Thus, in some implementations, mobile device 202 can be configured to receive wireless transmitter signals from wireless transmitters configured inside the building to determine and track the location of mobile device 202 as it moves through the building, as described above with reference to FIG. 1.

In some implementations, mobile device 202 (e.g., and 204, 206, etc.) can transmit location, speed and time information to server 208. For example, mobile device 202 can transmit its GNSS derived location, its indoor location, its determined speed and current timestamp to server 208. Mobile device 202 can report the location, speed and time information on a periodic basis. For example, mobile device 202 can report its location, speed and time information to server 208 every N seconds (e.g., 10, 15, 60 seconds, etc.). The mobile device 202 can transmit an identifier that identifies the mobile device along with the location, speed and time information. The identifier can be an anonymous identifier such that the location, speed and time information reported using the identifier can be correlated by server 208 based on the identifier. In some implementations, the identifier can be an anonymous identifier such the identifier cannot be used to identify the mobile device 202 or its user. For example, the identifier can be a random sequence of data that can be used to correlate the location information received from the mobile device 202 but that is otherwise meaningless.

In some implementations, server 208 can receive the location, speed, time and identification information from mobile device 202 and store the location, time, speed and identification information in location database 210. For example, server 208 can receive the GNSS determined location of the building, the indoor location of the mobile device 202, the speed of the mobile device, a timestamp corresponding to the indoor location and an anonymous identifier for correlating the location information with other reported location information. Server 208 can maintain a repository of building information in database 210 that includes reported location information for each building in the repository. When mobile device 202 reports indoor location information for a grocery store, server 208 can store the indoor location information received from mobile device 202 in a database table or other data structure that tracks reported indoor location information for a building.

Figure 3:
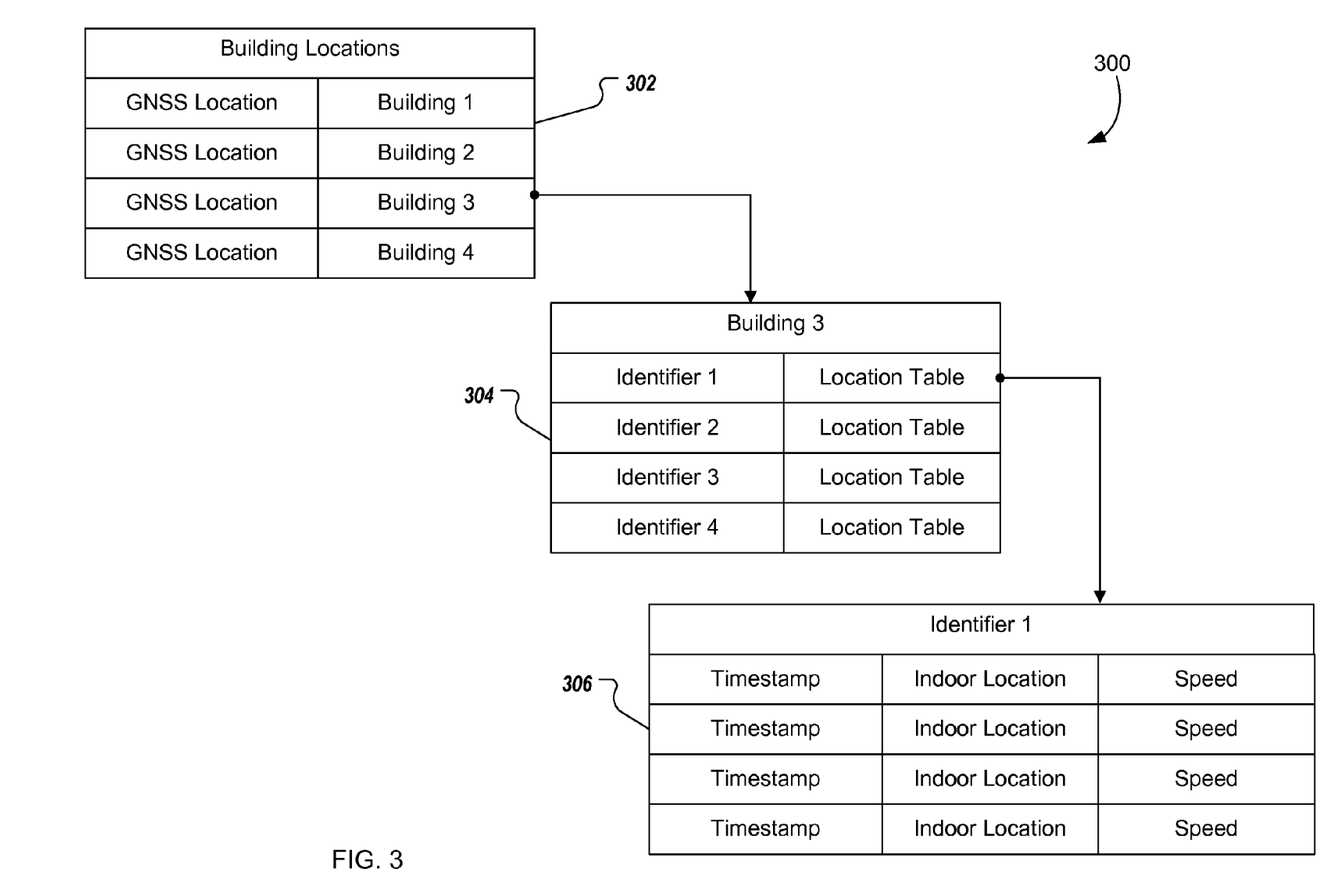
FIG. 3 illustrates example database tables that can be used to store indoor location information for buildings.

FIG. 3 illustrates example database tables 300 that can be used to store indoor location information for buildings. For example, database 210 can include a building locations table 302 that stores a mapping between GNSS locations and buildings. For example, when mobile device reports its GNSS derived location to server 208, server 208 can compare the GNSS location to the GNSS locations in table 302 to determine which building mobile device 202 is currently in. Database 210 can include a building traffic table 304 that, for a particular building, associates anonymous identifiers to device location tables. The location table entry in table 304 can point to a device location table 306 that stores associations between timestamps, reported indoor location and speed information for a particular mobile device. Thus, when server 208 receives location information from mobile device 202 (e.g. GNSS location, indoor location, speed, timestamp, anonymous identifier), server 208 can identify building traffic table 304 based on the GNSS derived location of the mobile device, identify a device location table 306 based on the anonymous identifier, and store the timestamp, indoor location and speed information in the device location table 306.

Referring back to FIG. 2, in some implementations, server 208 can analyze the indoor location information stored in location database 210 to determine or identify indoor traffic patterns for individual buildings. For example, the indoor location information can be analyzed to determine how much time a mobile device (e.g., mobile device 202) remains inside a building. However, a user of the mobile device may remain in the building longer based on the reason for the user's visit to the building. For example, one user may make a quick trip to the grocery store to pick up milk which may take a short time while another user may go to the grocery store to buy groceries for the week which may take a long time. Thus, determining traffic conditions inside a building or a business based solely on the amount of time spent in the store may not be useful when determining unwanted delay due to indoor traffic at the store.

Thus, in some implementations, the indoor location information can be analyzed to determine how much time the mobile device remains in certain parts of a building. For example, the building may have specific areas that create bottlenecks or slowdowns or cause users to wait inside the building (e.g., checkout counters, service desks, security checkpoints) and where the delays incurred in these areas are out of the control of the user. The server 208 can be configured with information (e.g., building map data, indoor map data) that identifies the indoor locations of areas in the buildings where people (and their mobile devices) may have to wait in line or wait for service. For example, indoor geo-fences can be specified around checkout registers, service counters, airport security checkpoints or other locations where users may be required to wait for service. The server 208 can analyze the received indoor location information to determine how long (e.g., on average) mobile devices wait in these areas. The server 208 can determine the average wait time per hour of the day and/or day of the week, for example.

In some implementations, server 208 can analyze indoor location and speed data to determine trajectory and speed information to determine areas in the building where users are delayed. For example, if a user is moving quickly around a building, then the user must not be in line at a checkout counter. If the user is moving slowly in a specific direction, then the user may be waiting in line to checkout. Server 208 can analyze indoor location data to determine patterns of slow movement in a specific direction to determine where bottlenecks occur in a building and how much time users spend standing in line.

In some implementations, server 208 can generate indoor traffic information for buildings based on the reported indoor locations of mobile devices. For example, server 208 can generate indoor traffic data that identifies the wait time (e.g., time standing in line or waiting for service, time wasted) for a time period during the day. For example, the average wait time can be calculated for fifteen minute period during the day (e.g., 12:00-12:15, 12:15-12:30, etc.) or the average wait time can be calculated for each hour of the day (e.g., 12:00-1:00, 1:00-2:00, etc.). Thus, the server 208 can provide indoor traffic information for a building that can be used to predict which parts of a day are busiest at a building and might cause the greatest delay or might waste the user's time and which parts of a day are slowest at a building where the user will be able to get in and out of the building as quickly as possible.

In some implementations, the average wait time can be calculated for each day of the week (e.g., Monday, Tuesday, etc.) so that the server 208 can provide indoor traffic information for a building that can be used to predict which day of the week is best to visit a building and which days of the week to avoid. For example, if the building is a Department of Motor Vehicles building, then the indoor traffic information might indicate that it will take a long time for the user to get in and out of the DMV on Monday but take a relatively short amount of time to get in and out of the building on a Wednesday or Thursday.

In some implementations, the indoor traffic information (e.g., average wait times per building per time of day per day of week) can be transmitted to mobile device 202 by server 208 so that mobile device 202 can enhance various services provided by the mobile device 202. For example, server 208 can transmit indoor traffic information for buildings near the location of mobile device 202. Server 208 can transmit indoor traffic information for buildings that mobile device 202 visits. For example, mobile device 202 can transmit GNSS location information to server 208 that identifies buildings that the mobile device has visited. Server 208 can transmit indoor traffic information to mobile device based on user input. For example, a user can provide input indicating that the user is interested in a building (e.g., has a future meeting at the building, will shop at the building, etc.) and the mobile device 202 can request indoor traffic information from server 208 for the specified building and/or other similar buildings nearby the location of the mobile device 202.

Graphical User Interface for Viewing Indoor Traffic

This disclosure describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Figure 4:
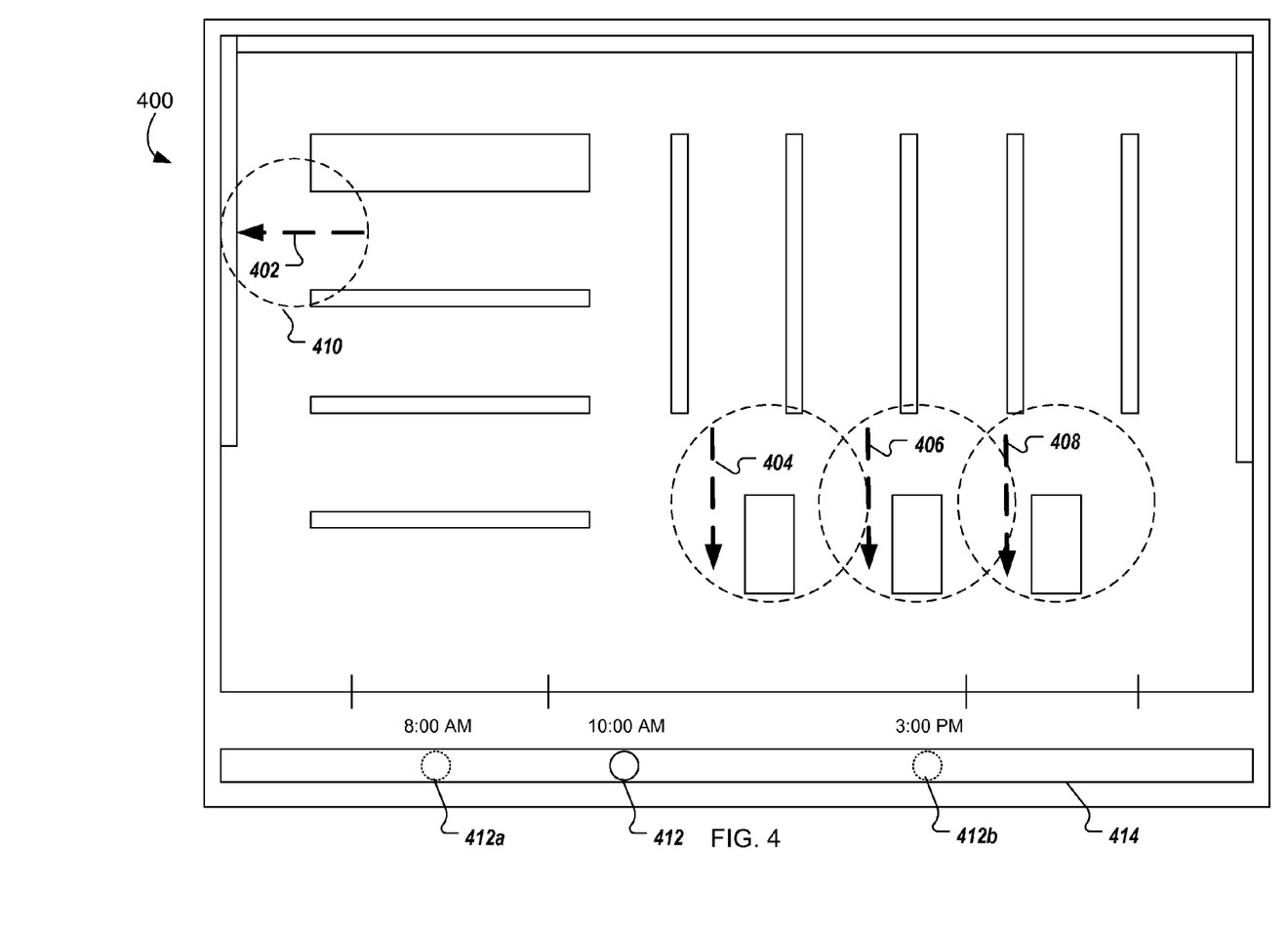
FIG. 4 illustrates an example graphical user interface for presenting indoor traffic information for a building to a user.

FIG. 4 illustrates an example graphical user interface 400 for presenting indoor traffic information for a building to a user. For example, the user can provide input to the mobile device indicating a business, building or address and the mobile device can respond by displaying graphical user interface 400. In some implementations, graphical user interface 400 interface can present a representation (e.g., a map) of the inside of a building. For example, the building can be an airport, bus station, grocery store, department store or any other type of building. Graphical user interface can include indicia of the indoor traffic in the building. For example, graphical user interface can include lines, colors, arrows, shaded or colored regions that indicate the amount of traffic in the building. For example, graphical user interface 400 includes lines 402-404 indicating areas in the store where users or customers might be required to wait in line. The areas can be predetermined and specified in map data associated with the building. The areas can be determined dynamically based on indoor location information reported by mobile devices that indicates mobile devices loiter or move slowly through these areas.

In some implementations, the lines or arrows 402-408 can be colored or sized to indicate the amount of delay or traffic associated with the area. For example, if there is a long delay (e.g., greater than a threshold time) associated with area 410, then line 402 can be colored red, drawn as a longer line, or a thicker line. If there is a short delay (e.g., less than a threshold time) associated with area 410, then line 402 can be colored green, drawn as a shorter line, or drawn as a thinner line. Likewise, if the speed of the mobile device is slow (e.g., below a threshold speed) as it moves through area 410, then line 402 can be colored red. If the speed of the mobile device is fast (e.g., above a threshold speed) as it moves through area 410, then line 402 can be colored green.

In some implementations, graphical user interface 400 can be adjusted to display indoor traffic for a building at different times during the day. For example, a user can select and drag handle 412 along timeline 414 to set the time of day for which indoor traffic should be displayed in graphical user interface 400. Thus, as the user moves handle 412 to different locations (e.g., 412*a*, 412*b*) on timeline 414, lines 402-408 can be adjusted to represent the amount of traffic or delay associated with the selected time of the day. For example, line 404 can change color from red to green and back to red as the user moves handle 412 along timeline 414 to indicate wait times in the areas of interest. Line 406 can grow longer or shorter to represent the amount of time a user must wait in line at the corresponding location on the building map at the selected times of day. Thus, if the user wishes to go shopping at the business associated with the building displayed in graphical user interface 400, the user can interact with graphical user interface 400 to determine which time of day would be the best time of day (e.g., with the least traffic, shortest lines, smallest wait time, etc.) to visit the business.

Use Cases for Indoor Traffic Information

In some implementations, indoor traffic information can be used to make recommendations for businesses to visit. For example, a user can request that the mobile device recommend a grocery store based on location and wait time. The mobile device can analyze indoor traffic information for grocery stores in the vicinity of the user specified location (or current location of the mobile device) and recommend the grocery store that has the shortest wait time (e.g., the least amount of traffic). For example, the user can submit a voice request to the mobile device such as "which grocery store should I go to?" or "which grocery store has the shortest lines?" and the mobile device can respond by displaying or speaking the name and the address of the grocery store having the shortest wait time based on collected indoor traffic information.

In some implementations, indoor traffic information can be used to make a recommendation for when to visit a business. For example, a user can speak a request "when should I go to Costco today?" or the user can request "when should I go to Costco this week?" In response to the request, the mobile device can analyze the indoor traffic information for the local Costco and determine the best time of day or day of the week to go to Costco to avoid waiting in long lines. For example, the mobile device can respond by indicating, by speech or graphical display, the best time or times to go to the local Costco on the current day or in the current week.

In some implementations, indoor traffic information can be used to automatically adjust reminders to accommodate wait times in a building. For example, the user can provide input to schedule a reminder for an airline flight departure time. The reminder can include a flight departure date and time and an airport identifier (e.g., airport name, address, abbreviation, etc.). The mobile device can use the airport identifier to request indoor traffic information for the airport at around the scheduled departure time from server 208. Once the indoor traffic information for the airport is received from the server, the mobile device can use the indoor traffic information and road traffic information (e.g., collected from another service) to adjust when the reminder is presented to the user. For example, if it takes 30 minutes to drive to the airport and the security wait time at the airport, as determined from the indoor traffic information, is 30 minutes, then the reminder can be adjusted so that the reminder is presented at least an hour before the flight departure time. In some implementations, the mobile device can present a graphical prompt indicating the delay associated with the security checkpoint at the airport and suggest changing the reminder or suggest when the user should leave to go to the airport.

Example Processes

Figure 5:
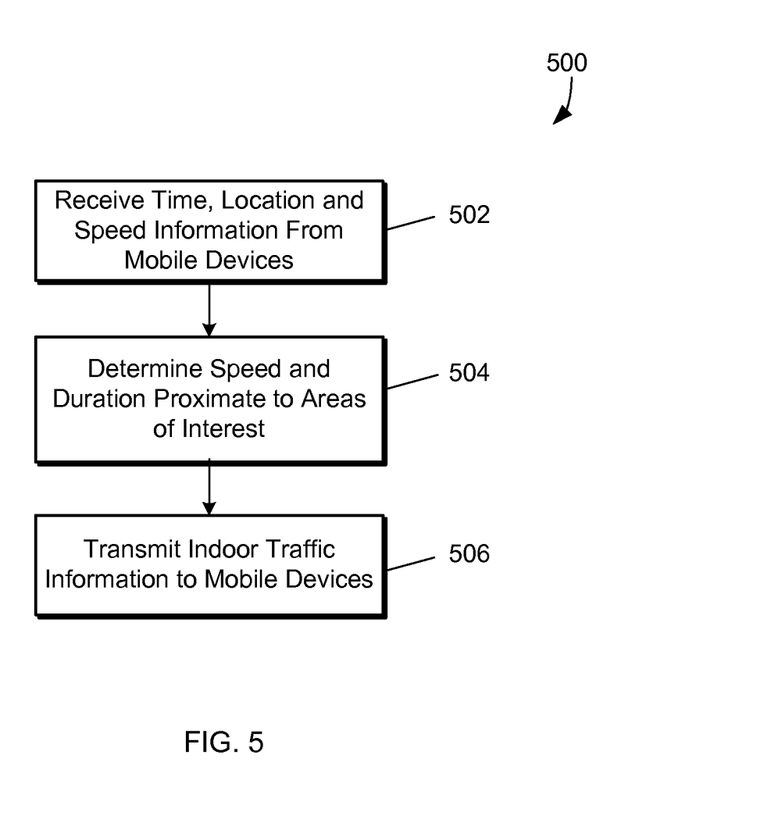
FIG. 5 is a flow diagram of an example process for generating indoor traffic information.

FIG. 5 is a flow diagram of an example process 500 for generating indoor traffic information. At step 502, a server can receive time, location and/or speed information from mobile devices. For example, each mobile device can be configured to receive GNSS signals and determine its location based on the GNSS signals. Each mobile device can be configured to receive wireless transmitter signals from wireless transmitters inside buildings that the mobile device visits. The mobile device can determine its indoor location based on the indoor wireless transmitter signals and map data corresponding to the building in which the mobile device is currently travelling. The mobile device can measure its movement using sensors (e.g., accelerometer) of the mobile device to determine the speed at which the mobile device is moving. The mobile device can determine the current time based in GNSS signals or an internal clock of the mobile device. The mobile device can transmit the GNSS derived location, indoor location, speed and current time to the server periodically so that the server can analyze the location, speed and time information and generate indoor traffic information.

At step 504, the server can determine the speed and/or duration the mobile device spends proximate to areas of interest inside buildings. For example, the server can analyze the indoor location information received from mobile devices to determine how long (e.g., average amount of time) each mobile device spends proximate to or within areas of interest inside a building. For example, the areas of interest can be predefined or specified in map data associated with each building. The map data can indicate checkout counters, service counters, security checkpoints or other areas of a building where lines may form or where bottlenecks occur as areas of interest inside a building. The areas of interest inside a building can be monitored using indoor geo-fences to determine when mobile devices are within areas of interest.

In some implementations, the server can generate wait times associated with each area of interest. For example, the server can determine how long (e.g., on average) a mobile device lingers within an area of interest per time period during a day. The server can, for example, determine the wait time for an area of interest for each hour, half hour, quarter hour, etc. of the day and for each day of the week.

At step 506, the server can transmit the indoor traffic information to the mobile devices. For example, the indoor traffic information can include the wait time to time period mappings generated by the server for each area of interest for each building requested by a mobile device. Thus, if wait times are calculated for each hour of the day, the indoor traffic information will include 24 calculated wait times for each area of interest within a particular building. If wait times are calculated for each day of the week (e.g., Monday-Sunday) and each hour of the day (e.g., 24 hours), then 168 wait times will be generated corresponding to each hour of each of the seven days.

Figure 6:
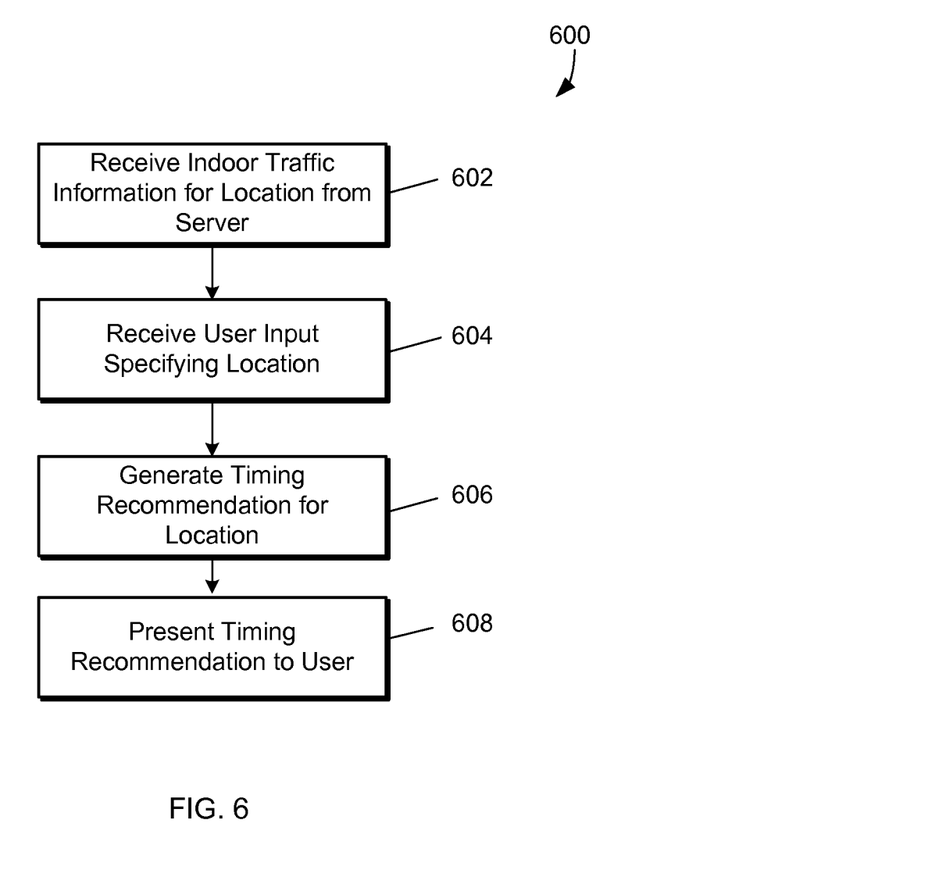
FIG. 6 is a flow diagram of an example process for enhancing user services with indoor traffic information.

FIG. 6 is a flow diagram of an example process 600 for enhancing user services with indoor traffic information. For example, a mobile device can provide reminder services, calendar services, make suggestions for grocery stores or restaurants and provide other user services that may be improved by including indoor traffic information in the provision of these services. By analyzing indoor traffic information and adjusting reminders or suggestions based on the indoor traffic information, the mobile device can help the user save time and/or ensure that the user arrives to scheduled destinations on time.

At step 602, a mobile device (or devices) can receive indoor traffic information for a location (or building) from a server. For example, the server can collected indoor location information from many mobile devices, correlate the indoor location information and generate indoor traffic information for buildings visited by the mobile devices. A mobile device can request and receive indoor traffic information for buildings that the mobile device visits. The mobile device can request and receive indoor traffic information for buildings specified by the user. For example, the user can specify a building by scheduling a calendar or reminder entry that specifies or indicates the building. The mobile device can request and receive indoor traffic information for a building based on a user requesting that the mobile device suggest a building or a business to visit. The mobile device can request and receive indoor traffic information for a building based on the user requesting to view an indoor traffic map of a specified building.

At step 604, the mobile device can receive user input specifying a location. For example, the user can specify a location by scheduling a reminder or calendar entry that specifies a location. The user can specify a location by requesting that the mobile device suggest a building, business or location to visit. For example, the user can request that the mobile device suggest a grocery store for the user to shop at that has the shortest lines (e.g., shortest wait period). The user can specify a location by requesting a traffic map of a particular location.

At step 606, the mobile device can generate a timing recommendation for a user specified location based on indoor traffic information for the location. For example, if the user schedules a reminder or calendar entry for a flight departure time out of an airport, the mobile device can analyze indoor traffic information corresponding to the airport and the departure time to determine the amount of indoor traffic (e.g., the wait time or delay associated with traversing a security checkpoint) at the airport around the departure time. The mobile device can then suggest to the user an adjustment to the reminder (e.g., adjust when the reminder is displayed) based on the indoor traffic at the airport. For example, instead of scheduling the reminder 15 minutes before the airplane departure, the mobile device can suggest and/or adjust the reminder to be displayed one hour before the departure time to account for 45 minutes in line at the airport security checkpoint.

As another example, a user can request that the mobile device recommend the best time to go shopping at a grocery store. The mobile device can analyze indoor traffic information for the grocery store and recommend the best time for the user to shop at the specified grocery store. The user can request a recommendation for which grocery store to shop at based on the wait time associated with each grocery store. For example, if the average wait time (e.g., time waiting in line) at one grocery store is 5 minutes and the average wait time at another grocery store is 15 minutes, then the mobile device can recommend that the user shop at the first grocery store with the 5 minute wait.

At step 608, the mobile device can present the timing recommendation to the user. For example, if the user's input specifying the location was made by voice command (e.g., "Which grocery store should I go to?"), then the mobile device can respond with an audio speech response (e.g., "Grocery store A has the shortest lines."). If the user's input specifying the location was made by GUI entry or selection, then the mobile device can present a prompt (e.g., window, dialog box, etc.) that indicates the mobile device's timing suggestion. Thus, if the user schedules a reminder for 15 minutes in advance of an event (e.g., airline departure), the mobile device can present a prompt suggesting that the reminder be scheduled for one hour in advance due to indoor traffic (e.g., security checkpoint lines) at the location.

Example System Architecture

Figure 7:
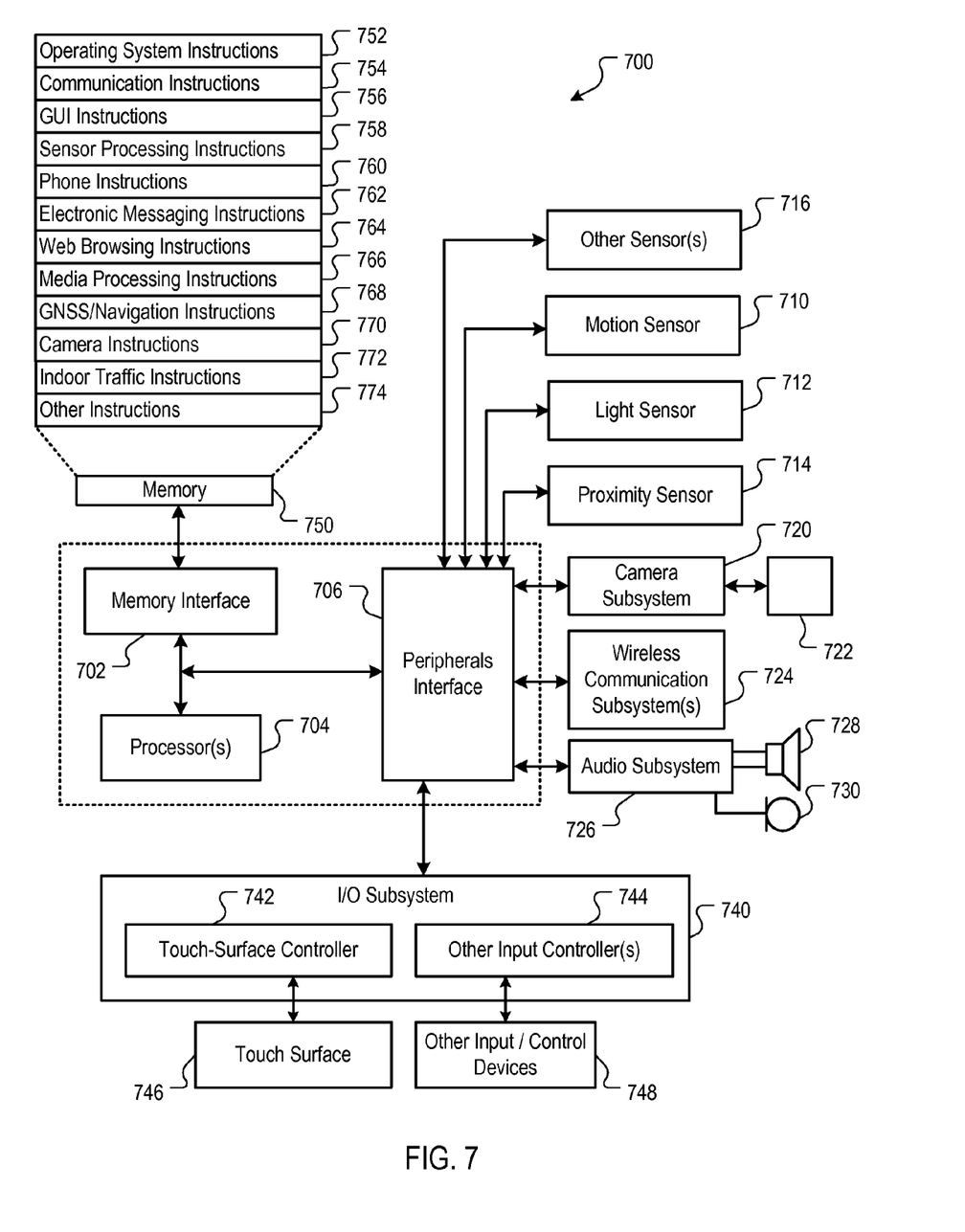
FIG. 7 is a block diagram of an exemplary system architecture implementing the features and processes of FIGS. 1-6.

FIG. 7 is a block diagram of an example computing device 700 that can implement the features and processes of FIGS. 1-6. The computing device 700 can include a memory interface 702, one or more data processors, image processors and/or central processing units 704, and a peripherals interface 706. The memory interface 702, the one or more processors 704 and/or the peripherals interface 706 can be separate components or can be integrated in one or more integrated circuits. The various components in the computing device 700 can be coupled by one or more communication buses or signal lines.

Sensors, devices, and subsystems can be coupled to the peripherals interface 706 to facilitate multiple functionalities. For example, a motion sensor 710, a light sensor 712, and a proximity sensor 714 can be coupled to the peripherals interface 706 to facilitate orientation, lighting, and proximity functions. Other sensors 716 can also be connected to the peripherals interface 706, such as a global navigation satellite system (GNSS) (e.g., GPS receiver), a temperature sensor, a biometric sensor, magnetometer or other sensing device, to facilitate related functionalities.

A camera subsystem 720 and an optical sensor 722, e.g., a charged coupled device (CCD) or a complementary metaloxide semiconductor (CMOS) optical sensor, can be utilized to facilitate camera functions, such as recording photographs and video clips. The camera subsystem 720 and the optical sensor 722 can be used to collect images of a user to be used during authentication of a user, e.g., by performing facial recognition analysis.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which the computing device 700 is intended to operate. For example, the computing device 700 can include communication subsystems 724 designed to operate over a GSM network, a GPRS network, an EDGE network, a Wi-Fi or WiMax network, and a Bluetooth™ network. In particular, the wireless communication subsystems 724 can include hosting protocols such that the device 700 can be configured as a base station for other wireless devices.

An audio subsystem 726 can be coupled to a speaker 728 and a microphone 730 to facilitate voice-enabled functions, such as speaker recognition, voice replication, digital recording, and telephony functions. The audio subsystem 726 can be configured to facilitate processing voice commands, voice-printing and voice authentication, for example.

The I/O subsystem 740 can include a touch-surface controller 742 and/or other input controller(s) 744. The touch-surface controller 742 can be coupled to a touch surface 746. The touch surface 746 and touch-surface controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 746.

The other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of the speaker 728 and/or the microphone 730.

In one implementation, a pressing of the button for a first duration can disengage a lock of the touch surface 746; and a pressing of the button for a second duration that is longer than the first duration can turn power to the computing device 700 on or off. Pressing the button for a third duration can activate a voice control, or voice command, module that enables the user to speak commands into the microphone 730 to cause the device to execute the spoken command. The user can customize a functionality of one or more of the buttons. The touch surface 746 can, for example, also be used to implement virtual or soft buttons and/or a keyboard.

In some implementations, the computing device 700 can present recorded audio and/or video files, such as MP3, AAC, and MPEG files. In some implementations, the computing device 700 can include the functionality of an MP3 player, such as an iPod™. The computing device 700 can, therefore, include a 36-pin connector that is compatible with the iPod. Other input/output and control devices can also be used.

The memory interface 702 can be coupled to memory 750. The memory 750 can include high-speed random access memory and/or non-volatile memory, such as one or more magnetic disk storage devices, one or more optical storage devices, and/or flash memory (e.g., NAND, NOR). The memory 750 can store an operating system 752, such as Darwin, RTXC, LINUX, UNIX, OS X, WINDOWS, or an embedded operating system such as VxWorks.

The operating system 752 can include instructions for handling basic system services and for performing hardware dependent tasks. In some implementations, the operating system 752 can be a kernel (e.g., UNIX kernel). In some implementations, the operating system 752 can include instructions for generating mobile device location and speed estimates. For example, operating system 752 can implement the indoor traffic and user service enhancement features as described with reference to FIGS. 1-6.

The memory 750 can also store communication instructions 754 to facilitate communicating with one or more additional devices, one or more computers and/or one or more servers. The memory 750 can include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GNSS/Navigation instructions 768 to facilitate GNSS and navigation-related processes and instructions; and/or camera instructions 770 to facilitate camera-related processes and functions.

The memory 750 can store other software instructions 772 to facilitate other processes and functions, such as the indoor traffic and user service enhancement processes and functions as described with reference to FIGS. 1-6.

The memory 750 can also store other software instructions 774, such as web video instructions to facilitate web video-related processes and functions; and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. An activation record and International Mobile Equipment Identity (IMEI) 774 or similar hardware identifier can also be stored in memory 750.

Each of the above identified instructions and applications can correspond to a set of instructions for performing one or more functions described above. These instructions need not be implemented as separate software programs, procedures, or modules. The memory 750 can include additional instructions or fewer instructions. Furthermore, various functions of the computing device 700 can be implemented in hardware and/or in software, including in one or more signal processing and/or application specific integrated circuits.

The invention claimed is:

1. A method comprising:
 receiving, by a server computer, indoor location information from a plurality of mobile devices operating inside the indoor location, the indoor location information including current locations and speeds of the plurality of mobile devices and timestamps indicating when the indoor location information was collected by the plurality of mobile devices;
 generating, by the server computer, indoor traffic information for an area of interest inside the indoor location based on the received indoor location information, the indoor traffic information indicating a pattern of movement of the plurality of mobile devices in the area of interest;

receiving, by the server computer, input from a client mobile device, the input requesting a timing suggestion;

generating, by the server computer the timing suggestion based on the indoor traffic information associated with the indoor location; and providing to the client mobile device the timing suggestion.

2. The method of claim 1, wherein generating a timing suggestion includes determining a wait time based on the indoor traffic information.

3. The method of claim 1, wherein generating a timing suggestion includes determining what period of a day a user should visit the indoor location.

4. The method of claim 1, wherein generating a timing suggestion includes suggesting an adjustment to a reminder based on the indoor traffic information.

5. The method of claim 1, wherein generating a timing suggestion includes determining what day of a week a user should visit the indoor location.

6. The method of claim 1, wherein providing indoor traffic information includes providing wait times corresponding to periods of a day for the indoor location.

7. The method of claim 1, wherein providing indoor traffic information includes providing wait times corresponding to days of a week for the indoor location.

8. The method of claim 1, wherein the indoor location is a building and the indoor traffic information includes wait times corresponding to areas of interest within the building.

9. A system comprising:

one or more processors; and a non-transitory computer-readable medium including one or more sequences of instructions which, when executed by the one or more processors, causes the one or more processors to perform operations comprising:

receiving, by a server computer, indoor location information from a plurality of mobile devices operating inside the indoor location, the indoor location information including current locations and speeds of the plurality of mobile devices and timestamps indicating when the indoor location information was collected by the plurality of mobile devices;

generating, by the server computer, indoor traffic information for an area of interest inside the indoor location based on the received indoor location information, the indoor traffic information indicating a pattern of movement of the plurality of mobile devices in the area of interest;

receiving input from a client mobile device, the input requesting timing information;

generating the timing suggestion based on the indoor traffic information associated with the indoor location; and providing to the client mobile device the timing suggestion.

10. The system of claim 9, wherein generating a timing suggestion includes determining a wait time based on the indoor traffic information.

11. The system of claim 9, wherein generating a timing suggestion includes determining what period of a day a user should visit the indoor location.

12. The system of claim 9, wherein generating a timing suggestion includes suggesting an adjustment to a reminder based on the indoor traffic information.

13. The system of claim 9, wherein generating a timing suggestion includes determining what day of a week a user should visit the indoor location.

14. The system of claim 9, wherein providing indoor traffic information includes providing wait times corresponding to periods of a day for the indoor location.

15. The system of claim 9, wherein providing indoor traffic information includes providing wait times corresponding to days of a week for the indoor location.

16. The system of claim 9, wherein the indoor location is a building and the indoor traffic information includes wait times corresponding to areas of interest within the building.

17. The method of claim 1, wherein at least one area of interest is defined by a geofence.

18. The method of claim 1, wherein the input is a search request and the timing suggestion is a recommendation for a business to visit based on a wait time for the business.

19. The system of claim 9, wherein at least one area of interest is defined by a geofence.

20. The system of claim 9, wherein the input is a search request and the timing suggestion is a recommendation for a business to visit based on a wait time for the business.

\* \* \* \* \*